United States Patent
Nishimura

(10) Patent No.: US 10,096,242 B2
(45) Date of Patent: Oct. 9, 2018

(54) DRIVING ASSIST APPARATUS FOR VEHICLE

(71) Applicant: TOYOTA JIDOSHA KABUSHIKI KAISHA, Toyota-shi, Aichi (JP)

(72) Inventor: Naoki Nishimura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 15/333,685

(22) Filed: Oct. 25, 2016

(65) Prior Publication Data

US 2017/0236414 A1 Aug. 17, 2017

(30) Foreign Application Priority Data

Feb. 12, 2016 (JP) .................. 2016-025250

(51) Int. Cl.
| | |
|---|---|
| G06K 9/00 | (2006.01) |
| G08G 1/0962 | (2006.01) |
| G08G 1/0967 | (2006.01) |
| B60K 35/00 | (2006.01) |
| B60K 37/00 | (2006.01) |

(52) U.S. Cl.
CPC ......... *G08G 1/09623* (2013.01); *B60K 35/00* (2013.01); *B60K 37/00* (2013.01); *G06K 9/00818* (2013.01); *G08G 1/09626* (2013.01); *G08G 1/096783* (2013.01)

(58) Field of Classification Search
CPC .......... G06K 9/00818; G08G 1/09623; G08G 1/096783; G08G 1/09626; B60K 35/00; B60K 37/00
See application file for complete search history.

(56) References Cited

U.S. PATENT DOCUMENTS

2016/0137127 A1* 5/2016 Yokochi ............. G06K 9/00798
348/148

FOREIGN PATENT DOCUMENTS

| JP | 2011-145892 A | 7/2011 |
| JP | 2012-068962 A | 4/2012 |

* cited by examiner

*Primary Examiner* — Tom Y Lu
(74) *Attorney, Agent, or Firm* — Oliff PLC

(57) ABSTRACT

The disclosed is a driving assist apparatus for a vehicle which can reduce the frequency at which information of a stop sign provided for an adjacent road is provided to a driver. The driving assist apparatus has a display control section which operates when a newly recognized road sign is a particular sign and determines whether or not a speed limit is equal to or lower than a display prohibition speed. The display control section does not display the mark of the recognized road sign on a display when the speed limit is higher than the display prohibition speed and displays the mark of the recognized road sign on the display when the speed limit is equal to or lower than the display prohibition speed.

6 Claims, 5 Drawing Sheets

DRIVING ASSIST APPARATUS FOR VEHICLE

BACKGROUND OF THE INVENTION

1. Field of the Invention

The present invention relates to a driving assist apparatus for vehicle which informs a driver of information on a road sign photographed by an onboard camera.

2. Description of the Related Art

Conventionally, there has been known a driving assist apparatus for vehicle which recognizes a road sign from an image captured by an onboard camera and displays information of the recognized road sign on an onboard display. For example, such a driving assist apparatus for vehicle is proposed in Japanese Patent Application Laid-Open (kokai) No. 2012-68962. Such a driving assist apparatus for vehicle allows a driver of a vehicle to properly drive the vehicle even when the driver fails to see a road sign on a road. Specifically, even in such a case, the driver notices the information of the road sign displayed on the onboard display and can properly drive the vehicle.

However, such a conventional driving assist apparatus for vehicle has a problem in that when an onboard camera of an own vehicle photographs a road sign provided on a road different from a road along which the own vehicle is travelling, information of the photographed road sign is displayed on an onboard display. Namely, there is a possibility that a road sign which is unrelated to the road along which the own vehicle is travelling is erroneously recognized as a road sign provided on the road along which the vehicle is travelling, and information regarding the erroneously recognized road sign is provided to the driver.

Such a problem occurs mainly at a point where a sub-road is connected to a main road. For example, as shown in FIG. 3, for a sub-road R2 which is connected to a main road R1, a stop sign RSstop is provided before the junction at which the sub-road R2 is connected to the main road R1. The road sign is not necessarily provided on the side where the travel lane is located (on the left side in the case of left-hand traffic). Therefore, a road sign for the sub-road R2 (the stop sign RSstop in this example) may be installed in the immediate vicinity of a travel lane of the main road R1 as in the case of the example of FIG. 3. In this case, the road sign for the sub-road R2 is captured by the onboard camera of a vehicle which travels on the main road R1 if the angle θ at which the sub-road R2 is connected to the main road R1 is small.

In general, erroneous recognition does not occur when road sign recognition is performed only for road signs which are installed on a road along which the own vehicle is travelling and are located within a predetermined range (hereinafter referred to as a "recognition range") on the outer side of the own vehicle with respect to the width direction (lateral direction) of the vehicle. However, in the case described above, a road sign for a road different from the road along which the own vehicle is travelling may be located in the recognition range and the problem mentioned above occurs.

Meanwhile, a road sign, such as a speed limit sign RSspeed, which shows a restriction within a certain section (hereinafter such a road sign will be referred to as a "sectional sign") is not installed at the junction as mentioned above. In some cases, such a road sign (sectional sign) may be installed at the junction; however, the road sign (sectional sign) shows the speed limit applied to the main road R1. Accordingly, sectional signs do not cause the problem of erroneous recognition.

Since such a sectional sign is applied to a long section, no problem arises if information of the sectional sign is provided to the driver in a period between a point in time at which the sectional sign is recognized and a point in time at which the own vehicle passes by the sectional sign. In contrast, as to a road sign (so-called point-specific sign applied only to a point at which the road sign is provided), such as a stop sign, which restrains vehicles from passing through a point at which that road sign is provided, while maintaining the travelling state, its information must be provided to the driver immediately upon recognition of the point-specific sign, because if the information of such a point-specific sign is provided to the driver when passing by the point-specific sign, it is too late.

SUMMARY OF THE INVENTION

The present invention has been accomplished so as to solve the above-described problem and an object of the present invention is to reduce the frequency at which information of erroneously recognized point-specific signs is provided to a driver, while providing information of properly recognized point-specific signs to the driver.

In order to achieve the above-described object, the present invention provides a driving assist apparatus for a vehicle, comprising:

road sign recognition means (12) for photographing a sight ahead of an own vehicle by using an onboard camera (11) and recognizing a road sign from an image of the sight photographed by the onboard camera;

display means (14) for displaying on an onboard display (30) information of the road sign recognized by the road sign recognition means so as to notify a driver of the information of the recognized road sign;

particular sign determination means (S12) for determining whether or not the road sign recognized by the road sign recognition means is a particular sign which is a road sign of a particular type set in advance and which is applied only to a point where the road sign is provided and restrains a vehicle from passing through the point while maintaining its traveling state;

road information acquisition means (12, 13) for acquiring at least one of a speed limit of a road along which the own vehicle is traveling and a road type of the road along which the own vehicle is traveling; and prohibition means (S15), operable when the road sign recognized by the road sign recognition means is determined to be the particular sign (S12: Yes), for prohibiting the display of information of the particular sign by the onboard display when the speed limit acquired by the road information acquisition means is higher than a display prohibition speed set in advance (S19: No) or when the road type acquired by the road information acquisition means is a particular road type which is set in advance and for which the particular sign is presumably not provided (S21: Yes).

In this case, the particular sign may be a stop sign. Alternatively, the particular sign may be a no entry sign.

In the present invention, the road sign recognition means photographs a sight ahead of the own vehicle through use of the onboard camera and recognizes a road sign from an image of the sight photographed by the onboard camera. Recognition of a road sign means recognition of information (contents) represented by the road sign. The display means displays on the onboard display the information of the road sign recognized by the road sign recognition means, and informs the driver of the information of the recognized road sign. As a result, even when the driver fails to see the road sign, the driver notices the information of the road sign displayed on the onboard display and can properly drive the vehicle.

For example, at a point where a sub-road is connected to a main road, there is provided a road sign (e.g., a stop sign) which restrains a driver of a vehicle traveling on the sub-road from passing through the point. Such a road sign is likely to be erroneously recognized by the driving assist apparatus for vehicle provided in a vehicle travelling on the main road, as a road sign for the main road along which the own vehicle is travelling.

Therefore, the driving assist apparatus for vehicle of the present invention comprises the particular sign determination means, the road information acquisition means, and the prohibition means. The particular sign determination means determines whether or not the road sign recognized by the road sign recognition means is a road sign of a particular type set in advance and which is applied only to a point where the road sign is provided and restrains the vehicle from passing through the point while maintaining its traveling state. For example, the particular sign is a stop sign, a no entry sign, or the like.

The road information acquisition means acquires at least one of the speed limit of a road along which the own vehicle is traveling and the road type of the road along which the own vehicle is traveling. The expression "acquires the speed limit" means to acquire a piece of information representing the speed limit. The expression "acquires the road type" means to acquire a piece of information representing the road type.

In the case of a road whose speed limit is high, in general, the above-mentioned particular sign is not provided ahead of the own vehicle. Also, in the case of a national expressway or an urban expressway, in general, the above-mentioned particular sign is not provided ahead of the own vehicle. In view of these facts, in the case where the road sign recognized by the road sign recognition means is determined to be the particular sign, the prohibition means prohibits the display of information of the particular sign by the onboard display when the speed limit acquired by the road information acquisition means is higher than a display prohibition speed set in advance. The display prohibition speed is set on the basis of, for example, the speed limit of a road for which the particular sign is presumably not provided.

Alternatively, when the road sign recognized by the road sign recognition means is determined to be the particular sign, the prohibition means prohibits the display of information of the particular sign by the onboard display when the road type acquired by the road information acquisition means is a particular road type which is set in advance and for which the particular sign is presumably not provided.

Accordingly, the driving assist apparatus for vehicle of the present invention can reduce the frequency at which information of erroneously recognized particular signs (point-specific signs) is provided to the driver, while providing information of properly recognized particular signs to the driver.

In the case where the road information acquisition means is configured to acquire the speed limit of the road along which the own vehicle is travelling, the road information acquisition means may acquire, for example, a speed limit indicated by a speed limit sign recognized by the road sign recognition means. In this case, the road sign recognition means can be used as a road information acquisition means. Therefore, it is unnecessary to add a dedicated means or configuration, whereby the driving assist apparatus for vehicle of the present invention can have a simple configuration.

According to one aspect of the present invention, the road information acquisition means (12, 13) acquires the speed limit and the road type of the road along which the own vehicle is traveling; and the prohibition means (S15), which is operable when the road sign recognized by the road sign recognition means is determined to be the particular sign (S12: Yes), is configured to prohibit the display of information of the particular sign by the onboard display when the speed limit acquired by the road information acquisition means is higher than the display prohibition speed (S19: No) and when the road information acquisition means cannot obtain the speed limit (S18: No) and the road type acquired by the road information acquisition means is the particular road type (S21: Yes).

According to the one aspect of the present invention, the display of the information of the particular sign is prohibited when the speed limit acquired by the road information acquisition means is higher than the display prohibition speed set in advance. However, in some cases, the road information acquisition means cannot obtain the speed limit. In such a case, the prohibition means prohibits the display of the information of the particular sign when the road type acquired by the road information acquisition means is the particular road type which is set in advance and for which the particular sign is presumably not provided.

Accordingly, even when the speed limit cannot be obtained, the driving assist apparatus for vehicle of the present invention can reduce the frequency at which information of erroneously recognized particular signs is provided to the driver, while providing information of properly recognized particular signs to the driver.

Noted that, in the above description, in order to facilitate understanding of the invention, the constituent element of the invention corresponding to those of an embodiment of the invention are denoted by parenthesized symbols which are used in the embodiment; however, the constituent elements of the invention are not limited to those in the embodiment denoted by the symbols.

DESCRIPTION OF THE PREFERRED EMBODIMENT

Figure 1:
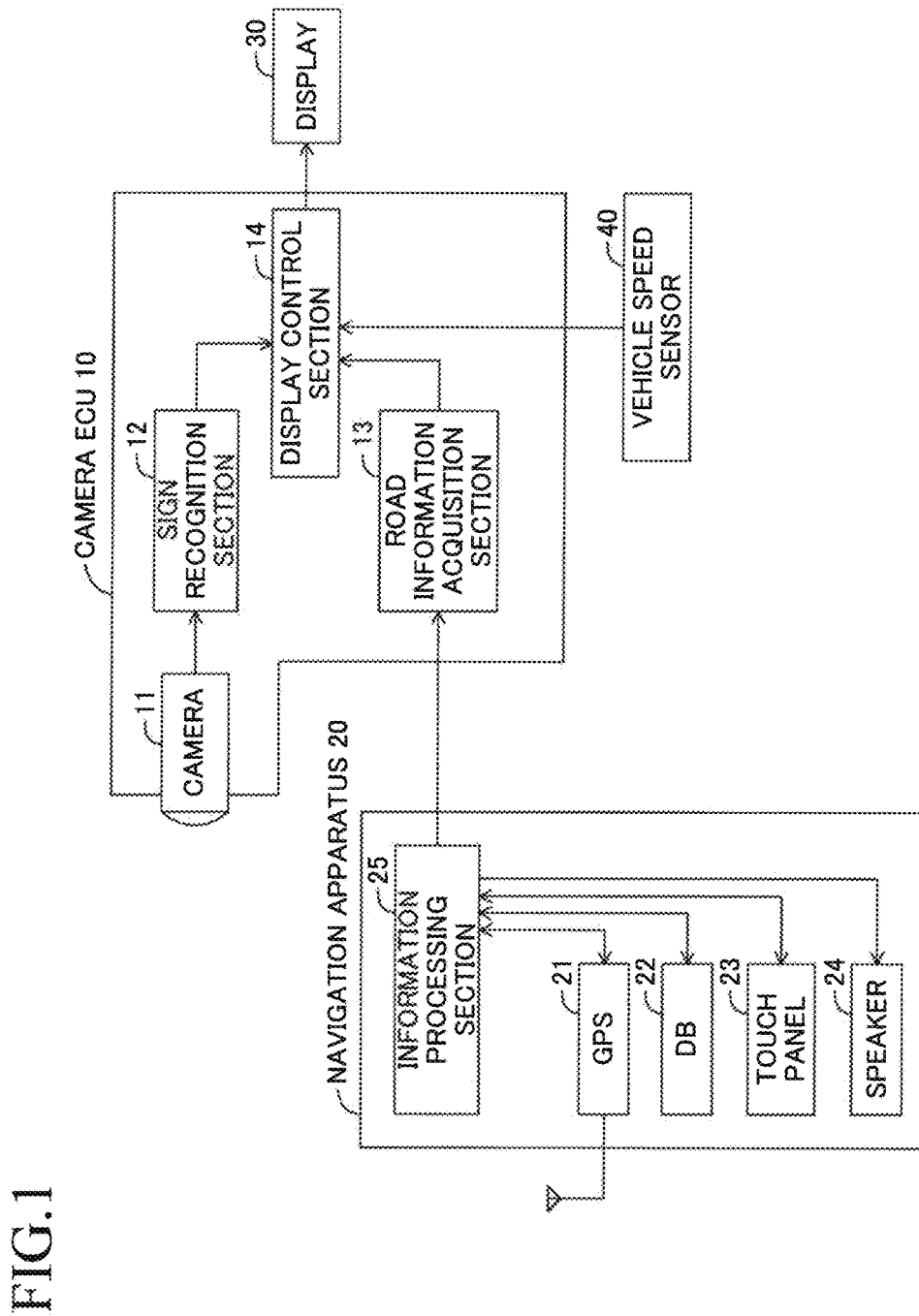
FIG. 1 is a schematic system diagram of a driving assist apparatus for vehicle according to an embodiment of the present invention.

An embodiment of the present invention will be described in detail with reference to the drawings. FIG. 1 is a schematic system diagram of a driving assist apparatus for vehicle according to the present embodiment.

The driving assist apparatus for vehicle is an onboard apparatus and includes a camera ECU 10. The camera ECU 10 includes an onboard camera 11. The camera ECU 10 also includes a sign recognition section 12, a road information acquisition section 13, and a display control section 14, which are realized mainly by the functions of a microcomputer. ECU is an abbreviation of an electric control unit. In this specification, a vehicle to which this driving assist apparatus for vehicle is installed is referred to as an "own vehicle".

The onboard camera 11 includes an imaging device (for example, a CCD imaging device or a CMOS imaging device). The onboard camera 11 photographs the sight forward of the own vehicle, and transmits image information obtained as a result of the photographing to the sign recognition section 12. The sign recognition section 12, which has an image analyzing function, receives the image information output from the onboard camera 11 and analyzes the image information so as to recognize a road sign contained in the photographed image. Namely, the sign recognition section 12 extracts a road sign from the photographed image and recognizes a piece of information (contents) represented by the extracted road sign. The sign recognition section 12 supplies the piece of information representing the recognized road sign (hereinafter referred to as the "road sign information") to the display control section 14. Noted that, the sign recognition section 12 is not required to recognize all types of road signs in such a manner that the types can be distinguished from one another, and may be designed to recognize predetermined road signs; for example, a speed limit sign and a no-passing sign which are sectional signs, and a stop sign and a no entry sign which are point-specific signs.

The road information acquisition section 13 is connected to a navigation apparatus 20 and obtains pieces of road information which represent the road type, etc. of a road along which the own vehicle is currently travelling from the navigation apparatus 20.

The navigation apparatus 20, which is an onboard apparatus, includes a GPS receiver 21 for detecting the position of the own vehicle; a database 22 which stores map information, etc.; a touch panel 23 and a speaker 24 which constitute a human-machine interface for providing route guidance, etc.; and an information processing section 25 which includes a microcomputer for performing various types of arithmetic processing on the basis of the information, etc. stored in the database 22. Since the touch panel 23 and the speaker 24 are not the essential components of the driving assist apparatus for vehicle of the present embodiment, the touch panel 23 and the speaker 24 can be omitted.

Road information is contained in the map information stored in the database 22. The road information contains node information regarding nodes which represent intersection points and other junctions in the expression of a road network, as well as link information regarding links each of which represents a road section between adjacent nodes. Also, the link information contains information representing a road type. The roads are categorized into, for example, national expressways, urban expressways, and ordinary roads (ordinary national roads, principal local roads, ordinary prefectural roads, and municipal roads) etc. These categories are road types.

The information processing section 25 is connected to the camera ECU 10 such that the information processing section 25 and the camera ECU 10 can communicate with each other. The information processing section 25 determines the road type of a road along which the own vehicle is travelling by referring to the road information stored in the database 22 on the basis of the position information of the own vehicle detected by the GPS receiver 21, and transmits a piece of information representing the road type to the camera ECU 10 (specifically, the road information acquisition section 13).

The road information acquisition section 13 provided in the camera ECU 10 receives the piece of information, which represents the road type and is transmitted from the information processing section 25 of the navigation apparatus 20, and supplies the road type information to the display control section 14.

The display control section 14 is connected to an onboard display 30 (hereinafter simply referred to as the display 30). The display 30 is, for example, a head-up display (hereinafter referred to as the "HUD"). The HUD receives pieces of display information from various ECUs of the own vehicle and displays the display information on a display region of a portion of the windshield of the own vehicle. When a road sign installed ahead of the own vehicle is recognized, the display control section 14 sends to the HUD a piece of information representing that road sign; for example, image data representing the mark of the road sign. As a result, the HUD displays the information of the road sign by using a portion of the display region. In the present embodiment, the HUD displays the mark of the road sign (the pattern of the road sign itself). However, in place of the mark of the road sign, the HUD may display the information (contents) represented by the road sign by using characters or the like.

Noted that, the display 30 is not limited to the HUD, and a meter display, the touch panel 23 of the navigation apparatus, or the like may be used as the display. The meter display is a display panel which includes meters, etc. (i.e., a speed meter, a tachometer, a fuel gauge, a water temperature gauge, an odo/trip meter, and a warning lamp) put together and which is disposed on the dashboard of the vehicle.

As to sectional signs (speed limit signs and no-passing signs) of the road signs photographed by the onboard camera 11, the sign recognition section 12 is very unlikely to erroneously recognize a road sign for a road adjacent to a road along which the own vehicle is travelling (hereinafter referred to as the "currently used road") as a road sign for the currently used road. However, as to road signs which are applied to sub-roads connected to the currently used road and are installed in the vicinity of the junctions between the sub-roads and the currently used road, the sign recognition section 12 is likely to erroneously recognize such a road sign for a sub-road as a road sign for the currently used road. Road signs which may be erroneously recognized are point-specific signs, such as stop sign and no entry sign, which impose travel-related restrictions on drivers only at points at which road signs are installed.

In view of the above, the display control section 14 does not display any point-specific sign using the display 30 when a display prohibition condition to be described later is satisfied. The road information transmitted from the navigation apparatus 20 is used as one of parameters for determining whether or not the display prohibition condition is satisfied. Also, the display control section 14 is connected to a vehicle speed sensor 40, and uses the vehicle speed provided from the vehicle speed sensor 40 as one of the parameters described above.

Figure 2:
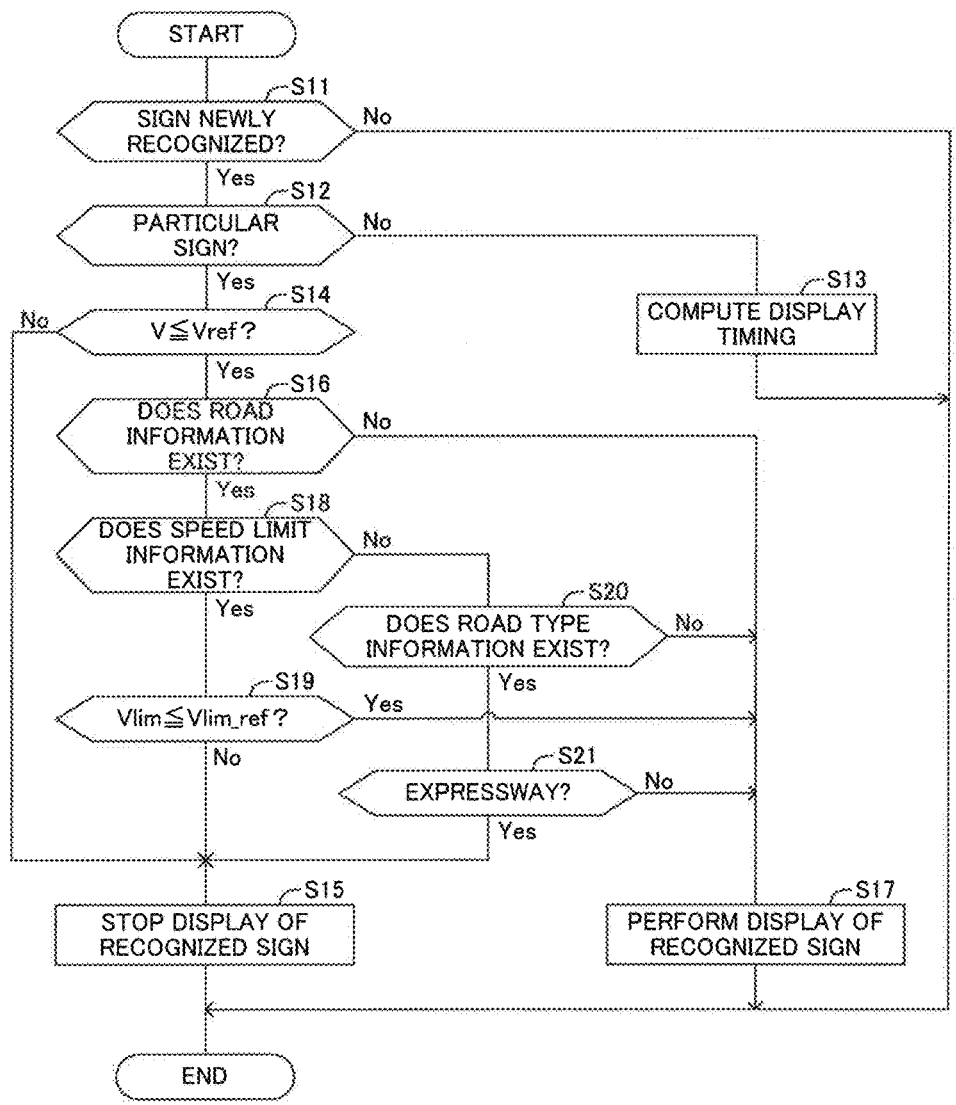
FIG. 2 is a flowchart showing a sign display control routine.
Figure 3:
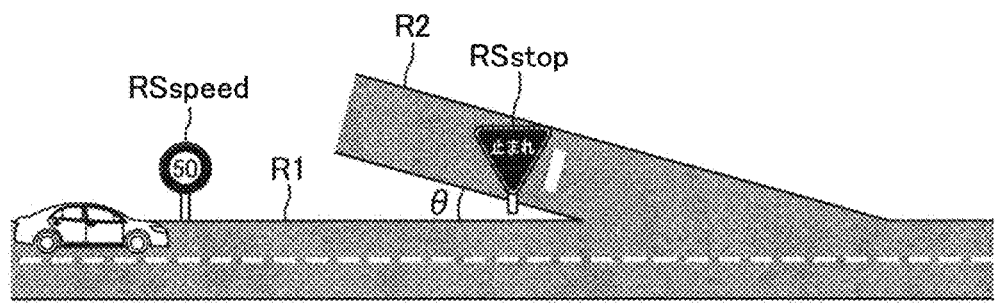
FIG. 3 is an explanatory view showing a road shape which is likely to cause erroneous recognition of a road sign and showing the position of the road sign.

FIG. 2 shows a sign display control routine performed by the display control section 14. The display control section 14 repeatedly executes the present routine at predetermined computation intervals when an ignition switch is in the ON state.

When the present routine is started, in step S11, the display control section 14 reads the road sign information from the sign recognition section 12 and determines whether or not a road sign has been newly recognized. In the case where no road sign has been newly recognized (S11: No), the display control section 14 ends the current execution of the present routine temporarily. The display control section 14 repeats the determination of step S11 at the predetermined computation intervals. When a road sign is newly recognized by the sign recognition section 12, the display control section 14 proceeds to step S12. In step S12, the display control section 14 determines whether or not the newly recognized road sign is a point-specific sign of a particular type set in advance.

In the present embodiment, the point-specific sign of the particular type used for the determination in step S12 is a stop sign. However, the no entry sign may be used for the determination instead of the stop sign, both the stop sign and the no entry sign may be used for the determination, and other point-specific signs may be additionally used. In the following description, the point-specific sign of the particular type set in advance will be referred to as a particular sign.

In the case where a point-specific sign for a sub-road connected to the currently used road is provided in the vicinity of the junction at which the sub-road is connected to the currently used road, that point-specific sign is likely to be erroneously recognized as a road sign for the currently used road. In particular, the stop sign is erroneously recognized at a high frequency. In the case where the newly recognized road sign is not the particular sign (S12: No), the display control section 14 presumes that erroneous recognition does not occur and proceeds to step S13. In step S13, the display control section 14 computes a timing for displaying the mark of the newly recognized road sign on the display 30. When the display timing comes, the display control section 14 displays the mark of the road sign on the display 30.

Since the present routine is repeatedly executed at the predetermined computation intervals, the mark of the road sign is displayed on the display 30 when the computed display timing comes. Accordingly, the display control section 14 stores the display timing by the processing of step S13, waits for the arrival of the display timing in an unillustrated different routine, and displays the mark of the road sign on the display 30 upon detection of the arrival of the display timing. After having executed the processing of step S13, the display control section 14 ends the current execution of the present routine temporarily.

In the case where the road sign is a sectional sign, the display timing is set to a timing at which the own vehicle reaches a position immediate before the sectional sign (a position which is located in the vicinity of the installation position of the sectional sign and is shifted toward the near side (the own vehicle side) from the installation position by a predetermined distance). For example, when the sign recognition section 12 recognizes a road sign, the recognition section 12 computes a distance between the own vehicle and the road sign on the basis of the size of the road sign in the image captured by the onboard camera 11. In the case where the onboard camera 11 is a stereoscopic camera, the distance between the own vehicle and the road sign may be computed on the basis of images captured by the two imaging devices of the stereoscopic camera. Upon completion of the computation of the distance between the own vehicle and the road sign, the sign recognition section 12 supplies the display control section 14 with the road sign information which includes a piece of distance information.

The display control section 14 determines whether or not the display timing has come on the basis of the distance information at the time when the road sign is recognized and the travel distance of the own vehicle after that time. A value obtained by integrating the vehicle speed detected by the vehicle speed sensor 40, a value obtained by cumulating the number of pulse signals output from an unillustrated wheel speed sensor, or a value, which changes with the travel distance, may be used as the travel distance.

In the case where the road sign is a point-specific sign, the display timing is set to a timing at which the road sign is recognized by the sign recognition section 12. Accordingly, simultaneously with the execution of step S13, the mark of the point-specific sign is displayed on the display 30.

Meanwhile, in the case where the newly recognized road sign is the particular sign (S12: Yes), in step S14, the display control section 14 reads the vehicle speed V at the present point in time detected by the vehicle speed sensor 40 and determines whether or not the vehicle speed V is equal to or lower than a determination vehicle speed Vref set in advance (60 km/h in the present embodiment). This determination vehicle speed Vref is a reference value used for determining whether or not the currently used road is a road for which the particular sign is presumably installed. In the case where the vehicle speed V is higher than the determination vehicle speed Vref, it is possible to presume that the particular sign is not installed for the currently used road. In this case, in step S15, the display control section 14 performs processing of stopping the display of the particular sign. Namely, since the road sign (the particular sign) recognized in step S11 may be an erroneously recognized, the display control section 14 determines not to display this road sign on the display 30.

Meanwhile, in the case where the vehicle speed V is equal to or lower than the determination vehicle speed Vref set in advance (S14: Yes), in step S16, the display control section 14 determines whether or not it holds the road information regarding the road along which the own vehicle is currently travelling. For example, the display control section 14 determines whether or not the sign recognition section 12 has recognized a speed limit sign (a speed limit sign photographed by the onboard camera 11) and determines whether or not the road type information of the road along which the own vehicle is currently travelling has been obtained from the database 22 of the navigation apparatus 20.

In the case where the display control section 14 does not hold the road information regarding the road along which the own vehicle is currently travelling (S16: No), the display control section 14 proceeds to step S17 so as to perform processing for displaying the particular sign. Namely, the display control section 14 performs processing of causing the display 30 to display the mark of the road sign (the particular sign) recognized in step S11. Accordingly, the mark of the particular sign (the mark of the stop sign) is displayed on the display 30. The mark of the particular sign is continuously displayed until the own vehicle passes through the point at which that road sign is installed.

Meanwhile, in the case where the display control section 14 holds the road information regarding the road along which the own vehicle is travelling (S16: Yes), the display control section 14 proceeds to step S18 so as to determine whether or not the road information contains speed limit information. In the case where the road information contains speed limit information (S18: Yes), the display control section 14 proceeds to step S19 so as to determine whether or not the speed limit Vlim is equal to or lower than a display prohibition speed Vlim_ref (40 km/h in the present embodiment). This display prohibition speed is a reference value used for determining whether or not the currently used road is a road for which the particular sign is presumably installed. In the case where the speed limit Vlim is higher than the display prohibition speed Vlim_ref (S19: No), it is possible to presume that the particular sign is not installed for the currently used road. In this case, the display control section 14 proceeds to step S15 so as to perform the processing of stopping the display of the particular sign. Accordingly, the mark of the particular sign recognized in step S11 is not displayed on the display 30. Namely, the mark of the particular sign is prohibited from being displayed.

Meanwhile, in the case where the speed limit Vlim is equal to or lower than the display prohibition speed Vlim_ref (S19: Yes), the display control section 14 proceeds to step S17 so as to perform the processing of causing the display 30 to display the mark of the particular sign.

Also, in the case where the road information does not contain the speed limit information (S18: No), in step S20, the display control section 14 determines whether or not the road information contains road type information. In the case where the road type of the road along which the own vehicle is currently travelling is stored in the database 22 of the navigation apparatus 20 (S20: Yes), the display control section 14 proceeds to step S21.

In step S21, the display control section 14 determines whether or not the road type of the road along which the own vehicle is currently travelling is the expressway (national expressway or urban expressway). In the case where the road type of the currently used road is the expressway (S21: Yes), it is possible to presume that the particular sign is not installed for the currently used road. In this case, the display control section 14 proceeds to step S15 so as to perform the processing of stopping the display of the particular sign. Accordingly, the mark of the particular sign recognized in step S11 is not displayed on the display 30.

Meanwhile, in the case where the road type of the currently used road is not the expressway (S21: No), the display control section 14 proceeds to step S17 so as to perform the processing of causing the display 30 to display the mark of the particular sign.

Noted that, in step S21, the display control section 14 determines whether or not the road type is the expressway. However, in addition to the expressway, other road types for which the particular sign is presumably not provided may be added in advance.

Also, in the case where the display control section 14 determines that the road information does not contain the road type information (S20: No), the display control section 14 proceeds to step S17 and performs the above-described display processing.

After completion of the processing of step S15 or the processing of step S17, the display control section 14 ends the current execution of the present routine temporarily, and repeats the above-described processing. Accordingly, the determination processing of step S11 is repeated until a new road sign is recognized. When a new road sign is recognized, the display processing is performed in accordance with the type of the road sign, the vehicle speed, the speed limit, and the road type.

According to the above-described driving assist apparatus for vehicle of the present embodiment, when the particular sign is recognized by the sign recognition section 12 and the speed limit Vlim of the currently used road is higher than the display prohibition speed Vlim_ref, it is presumed that the particular sign has been erroneously recognized and the display of the mark of the particular sign is prohibited. Meanwhile, when the speed limit Vlim of the currently used road is equal to or lower than the display prohibition speed Vlim_ref, the mark of the particular sign is displayed on the display 30. Accordingly, the driving assist apparatus can reduce the frequency at which information of erroneously recognized particular signs is provided to the driver, while providing information of properly recognized particular signs to the driver.

Also, since the speed limit of the currently used road can be obtained on the basis of the speed limit sign recognized by the sign recognition section 12, it is unnecessary to obtain the speed limit from the outside of the camera ECU 10 (for example, the external communication apparatus described later), whereby the satisfaction of the display prohibition condition can be determined by a simple configuration. Also, since the speed limit obtained from the sign recognition section 12 is the speed indicated by the speed limit sign provided for the actual road along which the vehicle is traveling, the speed limit obtained from the sign recognition section 12 is more reliable than the speed limit obtained from the outside.

Also, only when no speed limit information is obtained, the determination as to whether to display the particular sign is made on the basis of the road type of the currently used road. Namely, when the road type is the expressway, the particular sign is determined to have been erroneously recognized and the display of the mark of the particular sign is prohibited, and when the road type is not the expressway, the particular sign is determined to have been properly recognized and the mark of the particular sign is displayed. Accordingly, even in a situation where no speed limit information is obtained, the driving assist apparatus can reduce the frequency at which information of erroneously recognized particular signs is provided to the driver, while providing information of properly recognized particular signs to the driver.

For example, when roads are formed three dimensionally (e.g., when an expressway is formed above an ordinary road), in some cases, the road type cannot be properly determined from the position of the own vehicle detected by the GPS receiver 21. In order to overcome such a drawback, the driving assist apparatus of the present embodiment is configured to preferentially use speed limit information for the determination as to whether or not the particular sign has been erroneously recognized and to use the road type only when no speed limit information is obtained. Accordingly, the determination as to whether or not the particular sign has been erroneously recognized can be performed as accurately as possible.

Although the driving assist apparatus for vehicle according to the present embodiment has been described, the present invention is not limited to the above-described embodiment, and various modified embodiments are possible without departing from the scope of the invention.

Figure 4:
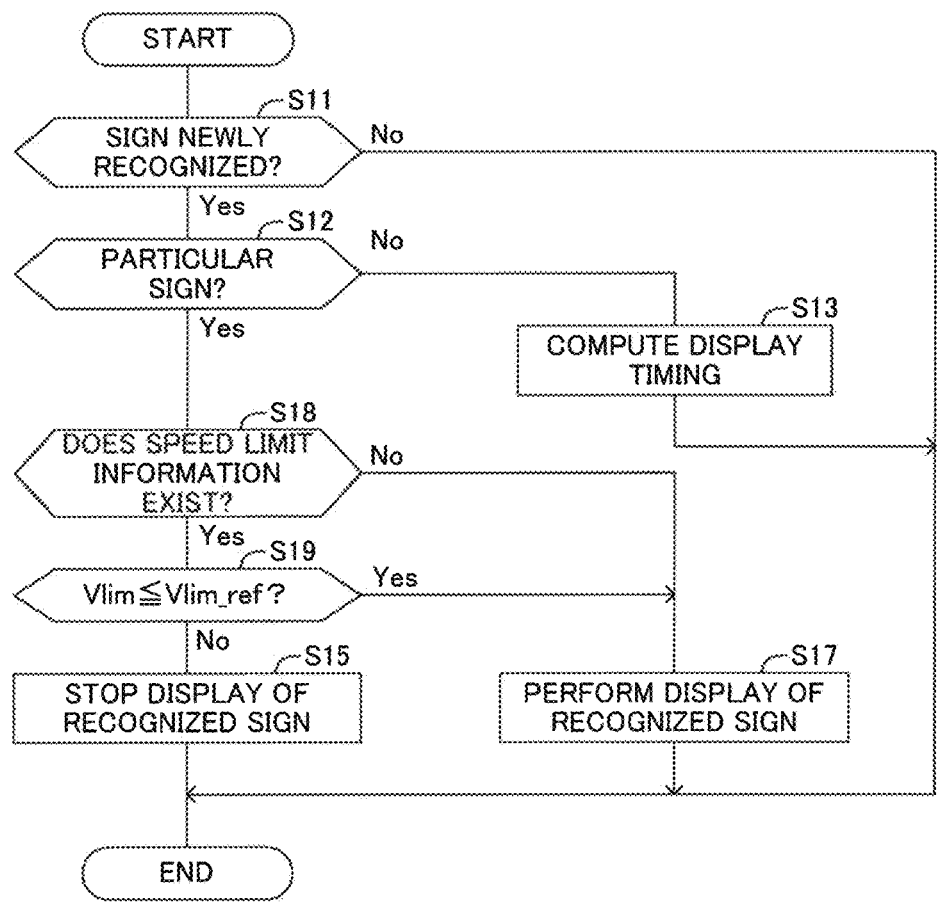
FIG. 4 is a flowchart showing a first modified embodiment of the sign display control routine.

For example, in the present embodiment, the switching control of performing and stopping the display of the particular sign is performed on the basis of the vehicle speed, the speed limit, and the road type. However, the above-mentioned control may be performed on the basis of the speed limit only. In this case, the sign display control routine may be preferably modified as shown in FIG. 4. FIG. 4 shows a first modified embodiment of the sign display control routine. In this first modified embodiment, the processing of steps S14, S16, S20, and S21 of the embodiment (FIG. 2) is omitted. In this case, since the driving assist apparatus for vehicle does not require road type information, the navigation apparatus 20 may be omitted. Accordingly, the driving assist apparatus for vehicle can be realized by a simple configuration; i.e., by the camera ECU 10 and the display 30 only.

Figure 5:
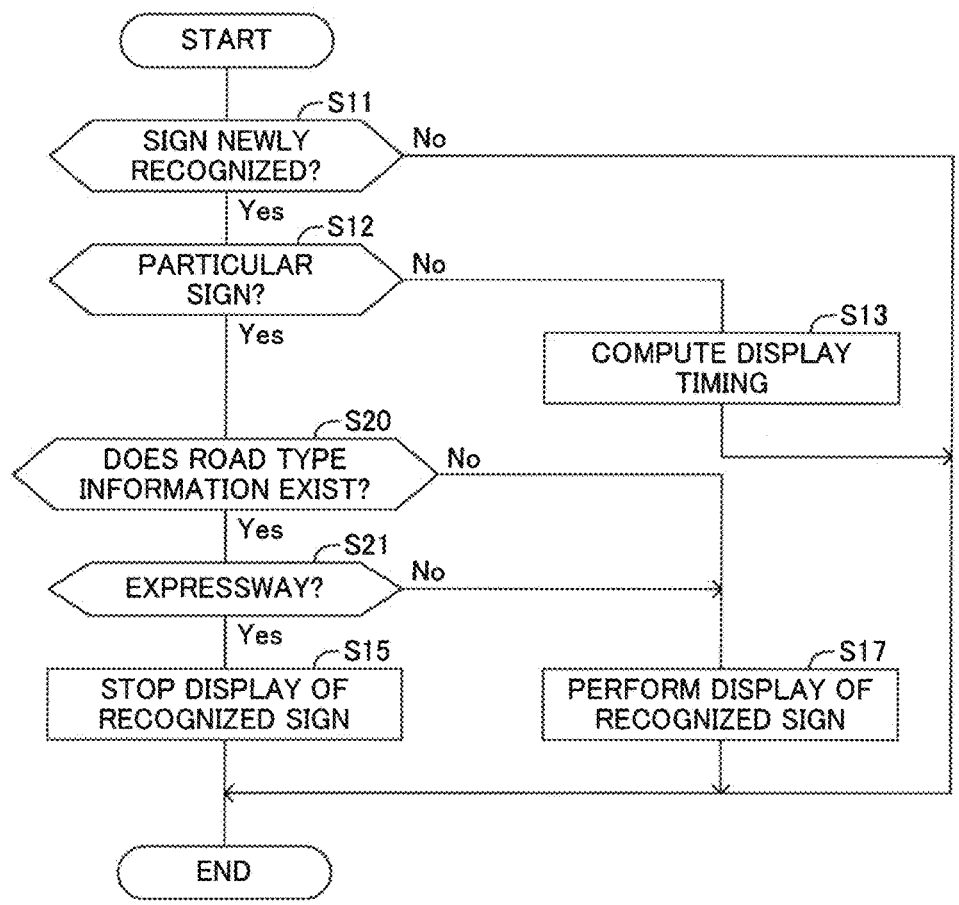
FIG. 5 is a flowchart showing a second modified embodiment of the sign display control routine.

Also, as shown in FIG. 5, the sign display control routine may be modified to be executed on the basis of the road type only. FIG. 5 shows a second modified embodiment of the sign display control routine. In this second modified embodiment, the processing of steps S14, S16, S18, and S19 of the embodiment (FIG. 2) is omitted.

Also, in the present embodiment, the road information (the road type) is obtained from the navigation apparatus 20; however, it is not required to use the navigation apparatus 20. For example, there can used an unillustrated onboard communication terminal which includes a GPS receiver for detecting the position of the own vehicle and a radio communication apparatus for performing radio commutations with an external communication apparatus. In this case, the position of the own vehicle is transmitted to the external communication apparatus, whereby the road information of the currently used road can be obtained from the external communication apparatus. In this case, the external communication apparatus may be a road side device provided along the road as an infrastructure, an onboard communication terminal provided in another vehicle traveling near the own vehicle, or a communication server provided in a communication network such as the Internet. In the case where the onboard communication terminal is provided, information of the speed limit sign for the currently used road may be obtained from the external communication apparatus as road information.

Further, in the present embodiment, the road type is contained in the link information stored in the database 22 of the navigation apparatus 20, and the road type is used in the sign display control routine. However, speed limit sign information may be contained in the link information. In such a case, the road information acquisition section 13 can obtain the speed limit of the currently used road from the navigation apparatus 20.

Accordingly, in a situation where the sign recognition section 12 has failed to recognize the speed limit sign, the speed limit can be obtained from the external communication apparatus or the navigation apparatus 20.

Also, in the present embodiment, the speed limit and the road type are used as road information. However, the accuracy in properly recognizing the particular sign may be increased by combining other pieces of road information therewith.

What is claimed is:

1. A driving assist apparatus for a vehicle, the apparatus comprising:
road sign recognition means for photographing a sight ahead of an own vehicle by using an onboard camera and recognizing a road sign from an image of said sight photographed by said onboard camera;
display means for displaying on an onboard display information of said road sign recognized by said road sign recognition means so as to notify a driver of said information of said recognized road sign;
particular sign determination means for determining whether or not said road sign recognized by said road sign recognition means is a particular sign, which is a road sign of a particular type set in advance, and which is applied only to a point where said road sign is provided and restrains a vehicle from passing through said point while maintaining its traveling state;
road information acquisition means for acquiring at least one of a speed limit of a road along which said own vehicle is traveling and a road type of said road along which said own vehicle is traveling; and
prohibition means, operable when said road sign recognized by said road sign recognition means is determined to be said particular sign, for prohibiting said display of information of said particular sign by said onboard display when said speed limit acquired by said road information acquisition means is higher than a display prohibition speed set in advance or when said road type acquired by said road information acquisition means is determined to be a particular road type, which is set in advance and for which said particular sign is presumably not provided.

2. The driving assist apparatus for a vehicle according to claim 1, wherein:
said road information acquisition means acquires said speed limit and said road type of said road along which said own vehicle is traveling; and
said prohibition means, which is operable when said road sign recognized by said road sign recognition means is determined to be said particular sign, is configured to prohibit said display of information of said particular sign by said onboard display when said speed limit acquired by said road information acquisition means is higher than said display prohibition speed and when said road information acquisition means cannot obtain said speed limit and said road type acquired by said road information acquisition means is said particular road type.

3. The driving assist apparatus for a vehicle according to claim 1, wherein said particular sign is a stop sign.

4. The driving assist apparatus for a vehicle according to claim 1, wherein said particular sign is a no entry sign.

5. The driving assist apparatus for a vehicle according to claim 2, wherein said particular sign is a stop sign.

6. The driving assist apparatus for a vehicle according to claim 2, wherein said particular sign is a no entry sign.

* * * * *